US008300437B2

(12) United States Patent
Lo et al.

(10) Patent No.: US 8,300,437 B2
(45) Date of Patent: Oct. 30, 2012

(54) MULTI-OUTPUT DC-TO-DC CONVERSION APPARATUS WITH VOLTAGE-STABILIZING FUNCTION

(75) Inventors: Cheng-Yi Lo, Taipei (TW); Chang-Chieh Yu, Taipei (TW)

(73) Assignee: Delta Electronics, Inc., Taoyuan County (TW)

( * ) Notice: Subject to any disclaimer, the term of this patent is extended or adjusted under 35 U.S.C. 154(b) by 171 days.

(21) Appl. No.: 12/824,871

(22) Filed: Jun. 28, 2010

(65) Prior Publication Data
US 2011/0157921 A1 Jun. 30, 2011

(30) Foreign Application Priority Data
Dec. 31, 2009 (TW) ................................ 98146281 A

(51) Int. Cl.
*H02J 1/10* (2006.01)
(52) U.S. Cl. ............ 363/65; 363/21.14; 363/69; 363/70
(58) Field of Classification Search ................ 363/21.04, 363/21.06, 21.12, 21.14, 65, 66, 67, 69, 70
See application file for complete search history.

(56) References Cited

U.S. PATENT DOCUMENTS

| 6,477,065 B2 * | 11/2002 | Parks ........................ 363/21.06 |
| 2001/0033506 A1 * | 10/2001 | Farrington et al. ........... 363/127 |
| 2006/0077694 A1 * | 4/2006 | Meszlenyi ..................... 363/16 |
| 2006/0152950 A1 * | 7/2006 | Reddy et al. .................... 363/39 |

\* cited by examiner

*Primary Examiner* — Nguyen Tran
(74) *Attorney, Agent, or Firm* — Muncy, Geissler, Olds & Lowe, PLLC

(57) ABSTRACT

A multi-output DC-to-DC conversion apparatus with a voltage-stabilizing function includes a center-tapped main transformer, a semiconductor component group, and a triggering controller. The DC-to-DC conversion apparatus provides at least two output voltages which are a main output voltage and an auxiliary output voltage, respectively. The auxiliary output voltage is functioned as an input voltage of a buck converter; and, as a result, the auxiliary output voltage can be adjusted to obtain a lower variable DC voltage. The triggering controller is used to stabilize the main output voltage and the auxiliary output voltage. Therefore, the main transformer provides one or two secondary windings to step down the auxiliary output voltage so as to increase efficiency of the buck converter.

9 Claims, 5 Drawing Sheets

MULTI-OUTPUT DC-TO-DC CONVERSION APPARATUS WITH VOLTAGE-STABILIZING FUNCTION

BACKGROUND OF THE INVENTION

1. Field of the Invention

The present invention relates to a DC-to-DC conversion apparatus, and more particularly to a multi-output DC-to-DC conversion apparatus with a voltage-stabilizing function.

2. Description of Prior Art

For a variety of electronic products, providing the most suitable DC voltage level for themselves has become a necessary trend. Thus, a useful method of converting the standard supply voltage into a required voltage for load is necessary, and which should satisfy general-purpose, high-efficiency, and high-reliability requirements. Because most electronic products, such as televisions, audios, computers, are supplied with DC-voltage electricity, the utility-line AC voltage has to be converted into DC voltages of various levels to make the electronic products perform properly.

Reference is made to FIG. 1 which is an architecture block diagram of a prior art power supply. The power supply mainly includes an EMI filter 10A, a rectifier 20A, a power factor corrector 30A, a DC-to-DC converter 40A, and a buck converter 70A. The DC-to-DC converter 40A has a plurality of power switches (not shown) and a main transformer (not shown). The EMI filter 10A is electrically connected to an AC source Vs to eliminate the conducted EMI noises in the AC lines. Therefore, in case of possible interference for different apparatuses connected to the power supply in the same distribution system could be restrained. The rectifier 20A is electrically connected to the EMI filter 10A to convert AC supply outputted form the EMI filter 10A to DC supply. The power factor corrector 30A is electrically connected to the rectifier 20A to improve the power factor of the power supply. The DC-to-DC converter 40A is electrically connected to the power factor corrector 30A to provide a voltage for the main transformer by controlling the power switches though a PWM control scheme. Therefore, the outputted DC supply of the power factor corrector 30A can be provided from the primary winding of the main transformer to the secondary winding thereof for energy conversion. The buck converter 70A is electrically connected to an output terminal Vo1 of the DC-to-DC converter 40A to provide a lower DC voltage.

The most popular power supplies provide +12V, +5Vsb, +5V, and +3.3V output voltages, which are supplied to desktop computers. For high-efficiency applications, the +12V output voltage (labeled as Vo1 in FIG. 1) is converted from the main transformer; whereas, the +5V output voltage (labeled as Vb1) and the +3.3V output voltage (labeled as Vb2) are obtained by converting the +12V voltage by the buck converter 70A. More particularly, the +12V voltage is more than two times as higher as the +5V (and even more than three times as higher as the +3.3V). Accordingly, a large voltage difference between the input voltage and the output voltage of the buck converter 70A would increase core losses of the internal magnetic components and switching losses of the power switches. Therefore, the efficiency of the buck converter 70A is reduced, particularly in much higher frequency operations.

Accordingly, it is desirable to provide a multi-output DC-to-DC conversion apparatus with a voltage-stabilizing function to provide lower-level voltage functioned as an input voltage to the buck converter, thus increasing efficiency of the buck converter.

SUMMARY OF THE INVENTION

In order to solve above-mentioned problems, a multi-output DC-to-DC conversion apparatus with a voltage-stabilizing function is disclosed. The multi-output DC-to-DC conversion apparatus generates a main output voltage and an auxiliary output voltage. The auxiliary output voltage is lower than the main output voltage and is functioned as an input voltage of a buck converter, and the buck converter is provided to convert the auxiliary output voltage into at least one lower adjustable DC voltage. The multi-output DC-to-DC conversion apparatus includes a main transformer, a semiconductor component group, and a triggering controller.

The main transformer has a primary winding and a secondary winding, and the secondary winding has a dotted terminal, a non-dotted terminal, and a medium terminal. The semiconductor component group is electrically connected to the dotted terminal and the non-dotted terminal of the secondary winding of the main transformer. One output terminal of the semiconductor component group is the ground, and the other output terminal is a main output terminal, which provides the main output voltage to the ground. The medium terminal is an auxiliary output terminal, which provides the auxiliary output voltage to the ground.

The triggering controller is electrically connected to the main output terminal and the auxiliary output terminal and generates a plurality of control signals to control switching frequency of the semiconductor component group for stabilizing the main output voltage and the auxiliary output voltage.

Therefore, the center-tapped main transformer with the single secondary winding provides the lower-level voltage, which is functioned as the input voltage of the buck converter to increase efficiency of the buck converter.

In order to solve above-mentioned problems, a multi-output DC-to-DC conversion apparatus with a voltage-stabilizing function is disclosed. The multi-output DC-to-DC conversion apparatus generates at least a main output voltage and an auxiliary output voltage. The auxiliary output voltage is lower than the main output voltage and is functioned as an input voltage of a buck converter, and the buck converter is provided to convert the auxiliary output voltage into at least one lower adjustable DC voltage. The multi-output DC-to-DC conversion apparatus includes a main transformer, a semiconductor component group, and a triggering controller.

The main transformer has a primary winding, a first secondary winding, and a second secondary winding. The first secondary winding and the second secondary winding have a dotted terminal, a non-dotted terminal, and a medium terminal, respectively.

The semiconductor component group is electrically connected to the dotted terminal and the non-dotted terminal of the first secondary winding and the dotted terminal and the non-dotted terminal of the second secondary winding of the main transformer. One output terminal of the semiconductor component group is the ground, and the other output terminal is an auxiliary output terminal, which provides the auxiliary output voltage to the ground. The medium terminal of the first secondary winding is a main output terminal, which provides the main output voltage to the ground.

The triggering controller is electrically connected to the main output terminal and the auxiliary output terminal and generates a plurality of control signals to control switching frequency of the semiconductor component group for stabilizing the main output voltage and the auxiliary output voltage.

Therefore, the center-tapped main transformer with the dual secondary windings provides the lower-level voltage, which is functioned as the input voltage of the buck converter to increase efficiency of the buck converter.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
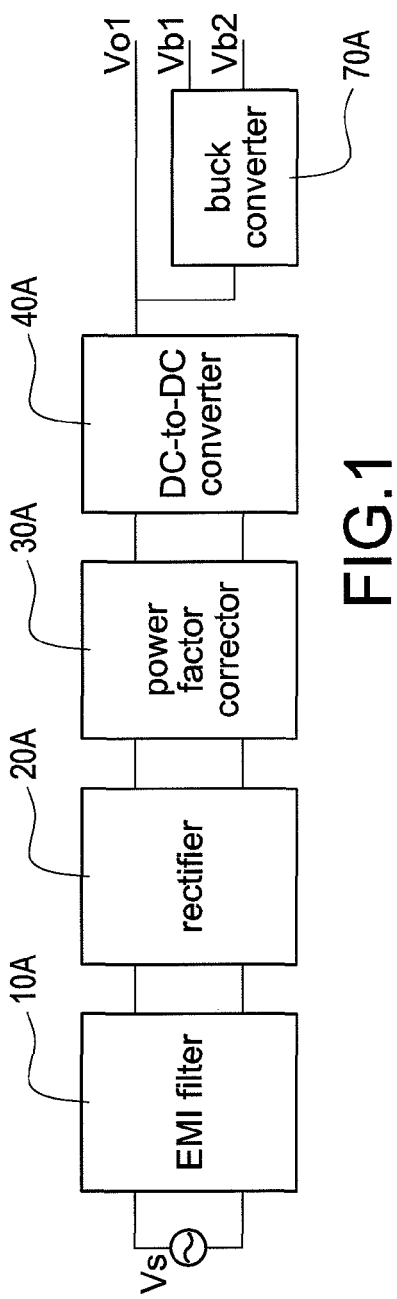
FIG. 1 is an architecture block diagram of a prior art power supply.

Reference will now be made to the drawing figures to describe the present invention in detail.

Figure 2:
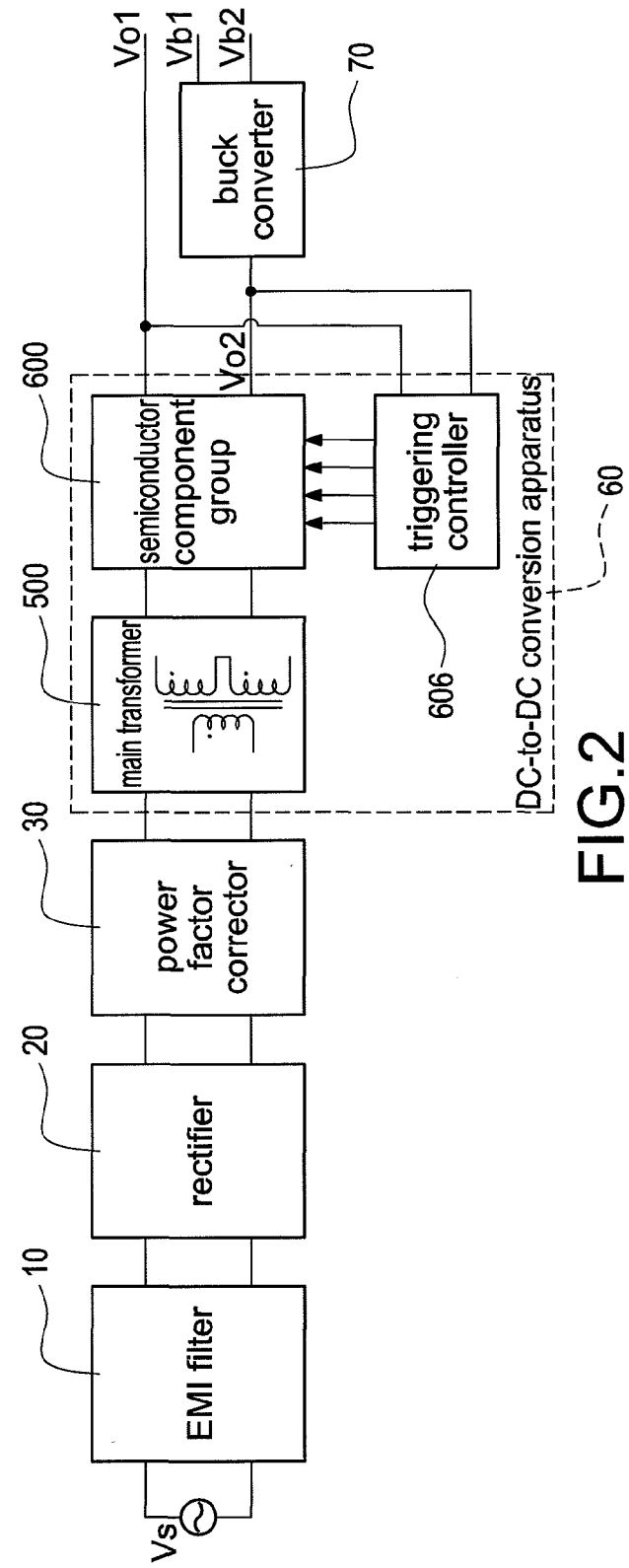
FIG. 2 is an architecture block diagram of a power supply according to the present invention.

Reference is made to FIG. 2 which is an architecture block diagram of a power supply according to the present invention. Parts of elements in the power supply are similar to those in the above-mentioned prior art power supply. The power supply includes an EMI filter 10, a rectifier 20, a power factor corrector (PFC) 30, a DC-to-DC conversion apparatus 60, and a buck converter 70. The DC-to-DC conversion apparatus 60 has a plurality of power switches (not shown), a main transformer 500, a semiconductor component group 600, and a triggering controller 606. The amount of the power switches required depends on the topology of the DC-to-DC conversion apparatus 60. The electrical connection and functions of the units in the power supply are similar to those in the prior art power supply, thus, the detail description is omitted here for conciseness. However, one major difference between the prior art power supply and the present power supply is that the main transformer 500 is a center-tapped transformer. More particularly, different arrangements of the secondary-side winding of the center-tapped transformer 500 provide various embodiments for the multi-output DC-to-DC conversion apparatus. The detailed description will be made as follows.

Figure 3A:
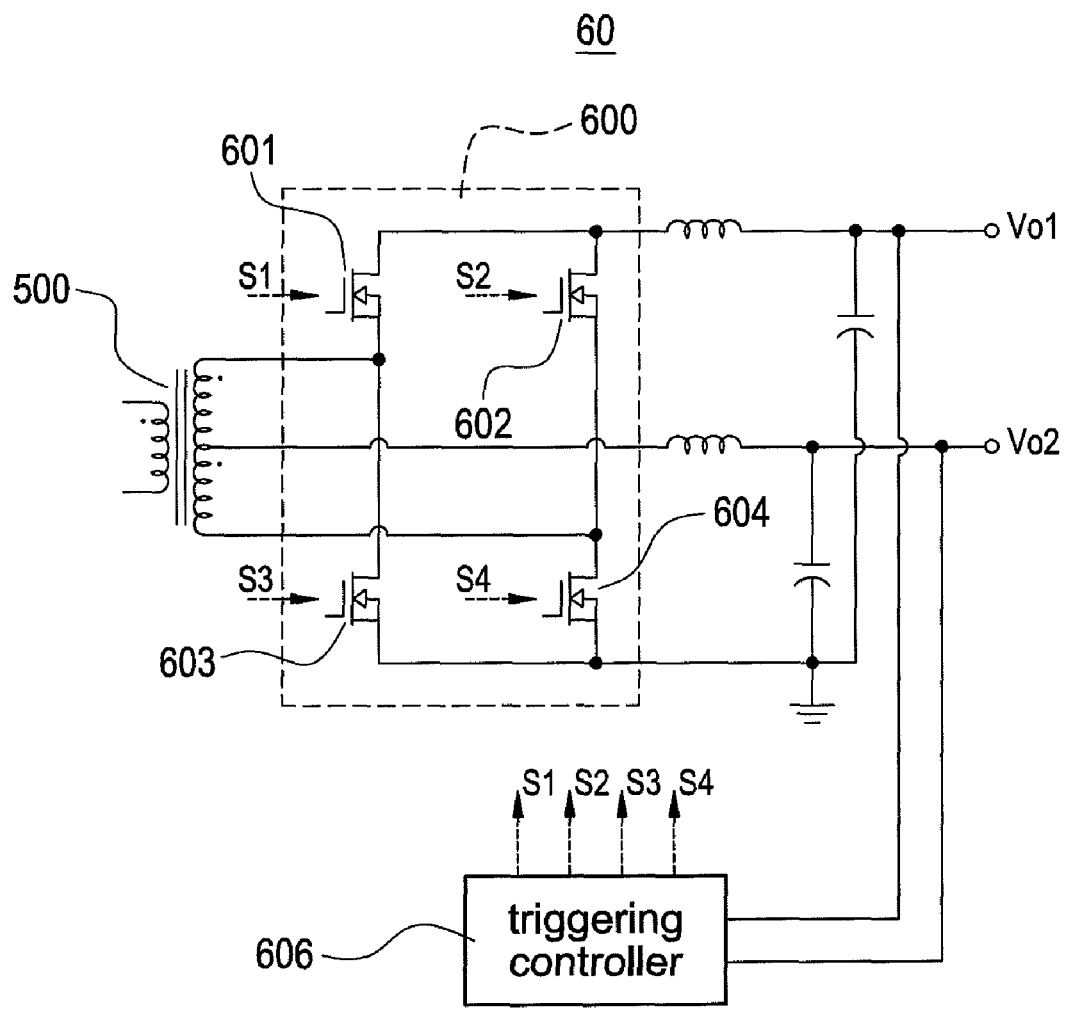
FIG. 3A is a circuit diagram of a first embodiment of a multi-output DC-to-DC conversion apparatus with a voltage-stabilizing function according to the present invention.

Reference is made to FIG. 3A which is a circuit diagram of a first embodiment of a multi-output DC-to-DC conversion apparatus with a voltage-stabilizing function according to the present invention. The multi-output DC-to-DC conversion apparatus 60 generates at least two output voltages, namely, a main output voltage and an auxiliary output voltage. The auxiliary output voltage is lower than the main output voltage and is functioned as an input voltage of a buck converter, and the buck converter is provided to convert the auxiliary output voltage into at least one lower adjustable DC voltage. The multi-output DC-to-DC conversion apparatus 60 includes a main transformer 500, a semiconductor component group 600, and a triggering controller 606.

The main transformer 500 has a primary winding (not labeled) and a secondary winding (not labeled). The primary winding has a dotted terminal (not labeled) and a non-dotted terminal (not labeled). The secondary winding has a center tap, a dotted terminal (not labeled), a non-dotted terminal (not labeled), and a medium terminal (not labeled).

The semiconductor component group 600 is electrically connected between the dotted terminal and the non-dotted terminal of the main transformer 500. One output terminal of the semiconductor component group 600 is the ground (not labeled) and the other output terminal is a main output terminal Vo1, and the main output terminal Vo1 provides the main output voltage to the ground. The medium terminal is an auxiliary output terminal Vo2, which provides the auxiliary output voltage to the ground.

The semiconductor component group 600 is composed of four semiconductor components, which have a first semiconductor component 601, a second semiconductor component 602, a third semiconductor component 603, and a fourth semiconductor component 604, respectively. Each of the four semiconductor components 601-604 has at least one first terminal (not labeled) and a second terminal (not labeled). As shown in FIG. 3A, the dotted terminal of the secondary winding of the main transformer 500 is electrically connected to the second terminal of the first semiconductor component 601, and the non-dotted terminal of the secondary winding is electrically connected to the first terminal of the fourth semiconductor component 604.

All of the four semiconductor components 601-604 are controllable semiconductor components, such as MOSFETs, BJTs, or IGBTs. In this example, more particularly, the MOSFETs are exemplified for further demonstration.

In addition, the second terminal of the first semiconductor component 601 is electrically connected to the first terminal of the third semiconductor component 603 in series. The second terminal of the second semiconductor component 602 is electrically connected to the first terminal of the fourth semiconductor component 604 in series. The first terminal of the first semiconductor component 601 is electrically connected to the first terminal of the second semiconductor component 602 to form the main output voltage of the semiconductor component group 600. Also, the second terminal of the third semiconductor component 603 is electrically connected to the second terminal of the fourth semiconductor component 604 to form the ground.

The triggering controller 606 is electrically connected to the main output terminal Vo1 and the auxiliary output terminal Vo2 to generate a plurality of control signals S1-S4. The duty cycle of the semiconductor component group 600 is controlled by the control signals S1-S4 to stabilize the main output voltage and the auxiliary output voltage. The detailed operation of the triggering controller 606 will be made hereinafter.

Figure 3B:
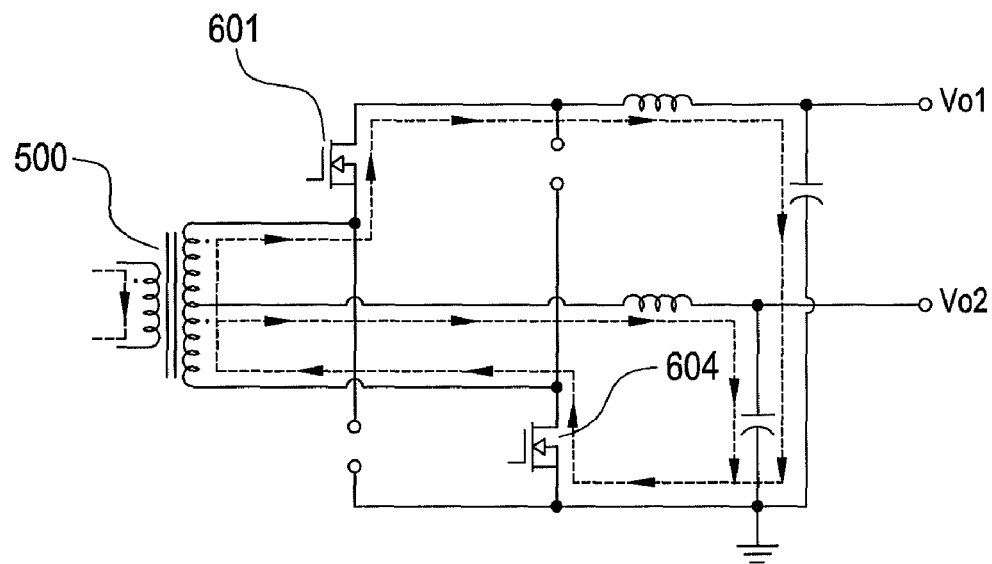
FIG. 3B is a circuit diagram of the first embodiment that the multi-output DC-to-DC conversion apparatus is operated with current in a positive half-cycle.

Reference is made to FIG. 3B which is a circuit diagram of the first embodiment that the multi-output DC-to-DC conversion apparatus is operated with current in a positive half-cycle. The main transformer 500 receives a processed primary-side current from the front-end circuit, and the primary-side current is a quasi-sinusoidal current. Thus, the primary-side current hereinafter is referred to as the quasi-sinusoidal current. During the positive half cycle of the quasi-sinusoidal current, the quasi-sinusoidal current flows into the dotted terminal of the primary winding; and a secondary-side current flows out the non-dotted terminal of the secondary winding. In this condition, the first semiconductor component 601 and the fourth semiconductor component 604 of the semiconductor component group 600 are forward biased, whereas the second semiconductor component 602 and the third semiconductor component 603 are reverse biased. Hence, the first semiconductor component 601 and the fourth semiconductor component 604 are turned-on; the second semiconductor component 602 and the third semiconductor component 603 are turned-off. The direction of arrow, shown in FIG. 3B, represents the direction of current flowing in the main transformer 500 and the semiconductor component group 600. Besides, the DC-to-DC conversion apparatus 60 further have inductor-capacitor filters (not labeled), which are used to filter the main output voltage and the auxiliary output voltage.

Figure 3C:
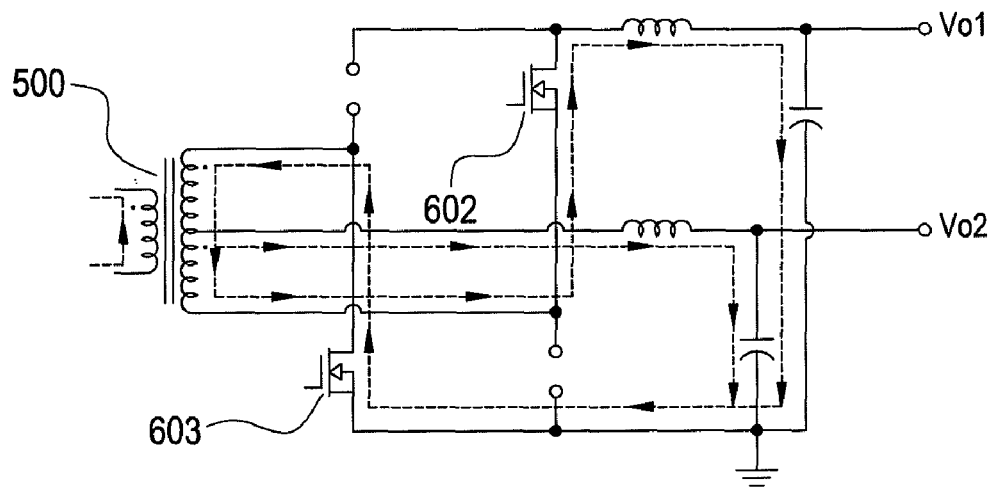
FIG. 3C is a circuit diagram of the first embodiment that the multi-output DC-to-DC conversion apparatus is operated with current in a negative half-cycle.

Reference is made to FIG. 3C which is a circuit diagram of the first embodiment that the multi-output DC-to-DC conversion apparatus is operated with current in a negative half-cycle. During the negative half cycle of the quasi-sinusoidal current, the quasi-sinusoidal current flows out the dotted terminal of the primary winding; and the secondary-side current flows into the dotted terminal of the secondary winding. In this condition, the second semiconductor component 602 and the third semiconductor component 603 of the semiconductor component group 600 are forward biased, whereas the first semiconductor component 601 and the fourth semiconductor component 604 are reverse biased. Hence, the second semiconductor component 602 and the third semiconductor component 603 are turned-on; the first semiconductor component 601 and the fourth semiconductor component 604 are turned-off. The direction of arrow, shown in FIG. 3C, represents the direction of current flowing in the main transformer 500 and the semiconductor component group 600. Besides, the DC-to-DC conversion apparatus 60 further have inductor-capacitor filters (not labeled), which are used to filter the main output voltage and the auxiliary output voltage.

Accordingly, the center-tapped main transformer 500 with the single secondary winding is applied to provide two output voltages from the DC-to-DC conversion apparatus 60:

1. The main output voltage is generated from the entire secondary winding;
2. The auxiliary output voltage is generated from the medium terminal of the secondary winding.

However, the two-output DC-to-DC conversion apparatus 60 is example for demonstration and not for limitation of the present invention.

Evidently, the main output voltage is twice of the auxiliary output voltage. More particularly, the main output voltage and the auxiliary output voltage can be stabilized in the predetermined voltages by the voltage-stabilizing feedback control.

In order to stabilize the main output voltage and the auxiliary output voltage in the predetermined voltages to supply the loads due to the variation of the input voltage as well as the load variation. The following schemes can be employed:

A comparator (not shown) is used to compare the main output voltage with a first reference voltage (not shown). The first reference voltage is, namely, the expected main output voltage of the multi-output DC-to-DC conversion apparatus 60, and which is assumed as +12V. More particularly, a voltage difference between the actual main output voltage and the first reference voltage is fed back to the triggering controller 606, which can be a PWM controller in this embodiment. When the main output voltage is higher than the first reference voltage, the comparator outputs a low-level signal to increase switching frequency of the first control signal S1 and the fourth control signal S4 during the positive half cycle of the quasi-sinusoidal current. Where the first control signal S1 and the fourth control signal S4 are a driving signal for a gate-source voltage Vgs of the first semiconductor component 601 and that of the fourth semiconductor component 604, respectively. In addition, the main output voltage would increase when the DC-to-DC conversion apparatus 60 operates at a light-load condition. Thus, during the negative half cycle of the quasi-sinusoidal current, the comparator outputs a low-level signal to increase switching frequency of the second control signal S2 and the third control signal S3, thus reducing the main output voltage and stabilizing it at +12V. Where the second control signal S2 and the third control signal S3 are a driving signal for a gate-source voltage Vgs of the second semiconductor component 602 and that of the third semiconductor component 603, respectively. In addition, because the auxiliary output voltage is proportional to the main output voltage (in this example, the main output voltage is twice of the auxiliary output voltage), the auxiliary output voltage can be stabilized at +6V.

Similarly, a comparator (not shown) is used to compare the auxiliary output voltage with a second reference voltage (not shown). The second reference voltage is, namely, the expected auxiliary output voltage of the multi-output DC-to-DC conversion apparatus 60, and which is assumed as +6V. More particularly, a voltage difference between the actual auxiliary output voltage and the second reference voltage is fed back to the triggering controller 606, which can be a PWM controller in this embodiment. When the auxiliary output voltage is lower than the second reference voltage, the comparator outputs a high-level signal to decrease switching frequency of the first control signal S1 and the fourth control signal S4. Where the first control signal S1 and the fourth control signal S4 are a driving signal for a gate-source voltage Vgs of the first semiconductor component 601 and that of the fourth semiconductor component 604, respectively. In addition, the auxiliary output voltage would reduce when the DC-to-DC conversion apparatus 60 operates at a heavy-load condition. Thus, during the negative half cycle of the quasi-sinusoidal current, the comparator outputs a high-level signal to decrease switching frequency of the second control signal S2 and the third control signal S3, thus increasing the auxiliary output voltage and stabilizing it at +6V. Where the second control signal S2 and the third control signal S3 are a driving signal for a gate-source voltage Vgs of the second semiconductor component 602 and that of the third semiconductor component 603, respectively. In addition, because the auxiliary output voltage is proportional to the main output voltage (in this example, the main output voltage is twice of the auxiliary output voltage), the main output voltage can be stabilized at +12V.

However, the above-mentioned examples of providing a voltage-stabilizing function are for demonstration and not for limitation of the present invention. Furthermore, the voltage-stabilizing circuits depend on the developed topologies of the switching power supply.

Therefore, the control signals for gate-source voltages of the controllable semiconductor components, which are MOSFETs in this embodiment, are controlled by sensing the main output voltage or the auxiliary output voltage. In addition, in this embodiment, the first semiconductor component 601 and the second semiconductor component 602 can be the uncontrollable semiconductor components, such as diodes. More particularly, the third semiconductor component 603 and the fourth semiconductor component 604 must be the controllable semiconductor components, such as MOSFETs, BJTs, or IGBTs. In other words, all of the four semiconductor components 601-604 are the controllable semiconductor components; or the first semiconductor component 601 and the second semiconductor component 602 are the uncontrollable semiconductor components, whereas the third semiconductor component 603 and the fourth semiconductor component 604 are the controllable semiconductor components.

Figure 4A:
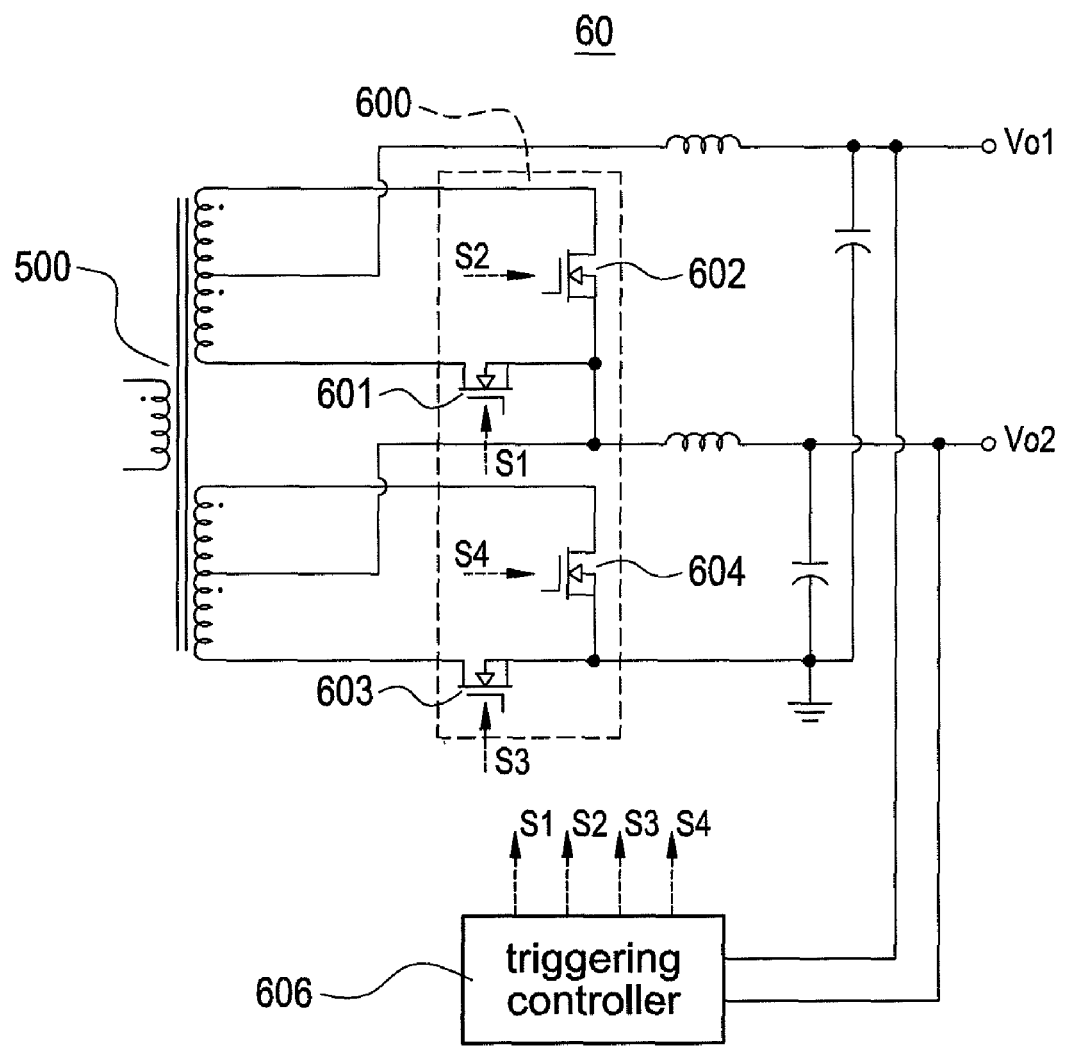
FIG. 4A is a circuit diagram of a second embodiment of a multi-output DC-to-DC conversion apparatus with a voltage-stabilizing function.

Reference is made to FIG. 4A which is a circuit diagram of a second embodiment of a multi-output DC-to-DC conversion apparatus with a voltage-stabilizing function. The multi-output DC-to-DC conversion apparatus 60 generates at least two output voltages, namely, a main output voltage and an auxiliary output voltage. The auxiliary output voltage is lower than the main output voltage and is functioned as an input voltage of a buck converter, and the buck converter is provided to convert the auxiliary output voltage into at least one lower adjustable DC voltage. The multi-output DC-to-DC conversion apparatus 60 includes a main transformer 500, a semiconductor component group 600, and a triggering controller 606.

The main transformer 500 has a primary winding (not labeled), a first secondary winding (not labeled), and a second secondary winding (not labeled). The primary winding has a dotted terminal (not labeled) and a non-dotted terminal (not labeled). The first secondary winding and the second secondary winding have a center tap, a dotted terminal (not labeled), a non-dotted terminal (not labeled), and a medium terminal (not labeled), respectively.

The semiconductor component group 600 is electrically connected between the dotted terminal and the non-dotted terminal of the main transformer 500. One output terminal of the semiconductor component group 600 is the ground (not labeled) and the other output terminal is an auxiliary output terminal Vo2, and the auxiliary output terminal Vo2 provides the auxiliary output voltage to the ground. The medium terminal of the first secondary winding is a main output terminal Vo1, which provides the main output voltage to the ground.

The semiconductor component group 600 is composed of four semiconductor components, which have a first semiconductor component 601, a second semiconductor component 602, a third semiconductor component 603, and a fourth semiconductor component 604, respectively. Each of the four semiconductor components 601-604 has at least one first terminal (not labeled) and a second terminal (not labeled). As shown in FIG. 4A, the dotted terminal of the first secondary winding of the main transformer 500 is electrically connected to the first terminal of the second semiconductor component 602, and the non-dotted terminal of the first secondary winding is electrically connected to the first terminal of the first semiconductor component 601. Also, the non-dotted terminal of the second secondary winding is electrically connected to the first terminal of the third semiconductor component 603.

All of the four semiconductor components 601-604 are controllable semiconductor components, such as MOSFETs, BJTs, or IGBTs. In this example, more particularly, the MOSFETs are exemplified for further demonstration.

In addition, the second terminal of the first semiconductor component 601 is electrically connected to the second terminal of the second semiconductor component 602 and the medium terminal of the second secondary to form the auxiliary output terminal Vo2. Also, the second terminal of the third semiconductor component 603 is electrically connected to the second terminal of the fourth semiconductor component 604 to from the ground.

The triggering controller 606 is electrically connected to the main output terminal Vo1 and the auxiliary output terminal Vo2 to generate a plurality of control signals S1-S4. The duty cycle of the semiconductor component group 600 is controlled by the control signals S1-S4 to stabilize the main output voltage and the auxiliary output voltage. The detailed operation of the triggering controller 606 will be made hereinafter.

Figure 4B:
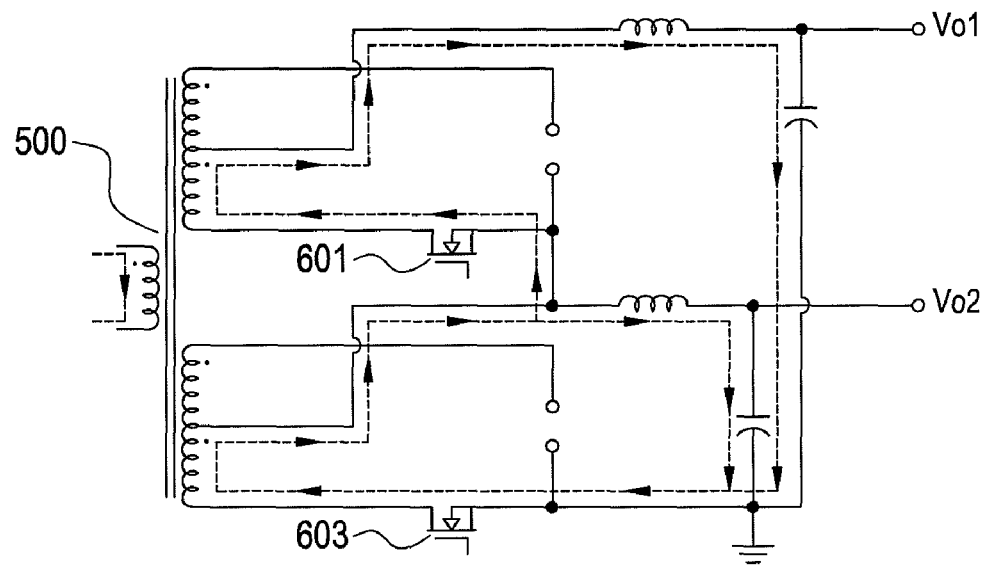
FIG. 4B is a circuit diagram of the second embodiment that the multi-output DC-to-DC conversion apparatus is operated with current in a positive half-cycle.

Reference is made to FIG. 4B which is a circuit diagram of the second embodiment that the multi-output DC-to-DC conversion apparatus is operated with current in a positive half-cycle. The main transformer 500 receives a processed primary-side current from the front-end circuit, and the primary-side current is a quasi-sinusoidal current. Thus, the primary-side current hereinafter is referred to as the quasi-sinusoidal current. During the positive half cycle of the quasi-sinusoidal current, the quasi-sinusoidal current flows out the non-dotted terminal of the primary winding; and a secondary-side current flows into the non-dotted terminal of the first secondary winding and the second secondary winding, respectively. In this condition, the first semiconductor component 601 and the third semiconductor component 603 of the semiconductor component group 600 are forward biased, whereas the second semiconductor component 602 and the fourth semiconductor component 604 are reverse biased. Hence, the first semiconductor component 601 and the third semiconductor component 603 are turned-on; the second semiconductor component 602 and the fourth semiconductor component 604 are turned-off. The direction of arrow, shown in FIG. 4B, represents the direction of current flowing in the main transformer 500 and the semiconductor component group 600. Besides, the DC-to-DC conversion apparatus 60 further have inductor-capacitor filters (not labeled), which are used to filter the main output voltage and the auxiliary output voltage.

Figure 4C:
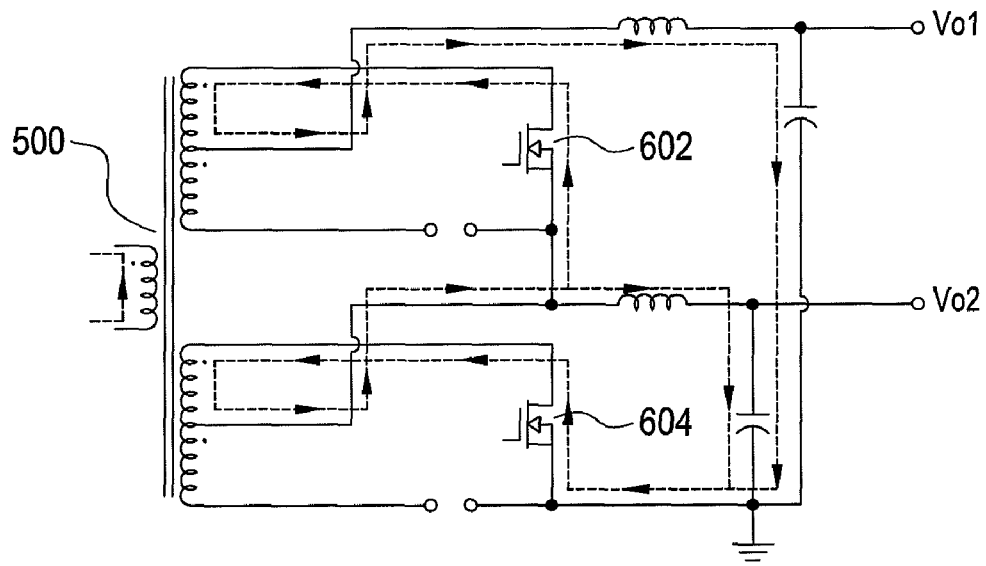
FIG. 4C is a circuit diagram of the second embodiment that the multi-output DC-to-DC conversion apparatus is operated with current in a negative half-cycle.

Reference is made to FIG. 4C which is a circuit diagram of the second embodiment that the multi-output DC-to-DC conversion apparatus is operated with current in a negative half-cycle. During the negative half cycle of the quasi-sinusoidal current, the quasi-sinusoidal current flows out the dotted terminal of the primary winding; and the secondary-side current flows into the dotted terminal of the first secondary winding and the second secondary, respectively. In this condition, the second semiconductor component 602 and the fourth semiconductor component 604 of, the semiconductor component group 600 are forward biased, whereas the first semiconductor component 601 and the third semiconductor component 603 are reverse biased. Hence, the second semiconductor component 602 and the fourth semiconductor component 604 are turned-on; the first semiconductor component 601 and the third semiconductor component 603 are turned-off. The direction of arrow, shown in FIG. 4C, represents the direction of current flowing in the main transformer 500 and the semiconductor component group 600. Besides, the DC-to-DC conversion apparatus 60 further have inductor-capacitor filters (not labeled), which are used to filter the main output voltage and the auxiliary output voltage.

Accordingly, the center-tapped main transformer 500 with the dual secondary winding is applied to provide two output voltages from the DC-to-DC conversion apparatus 60:

1. The main output voltage is generated from connecting the medium terminal of the first secondary winding and that of the second secondary winding in series;

2. The auxiliary output voltage is generated from the medium terminal of the second secondary winding.

However, the two-output DC-to-DC conversion apparatus 60 is example for demonstration and not for limitation of the present invention.

Evidently, the main output voltage is twice of the auxiliary output voltage. More particularly, the main output voltage and the auxiliary output voltage can be stabilized in the predetermined voltages by the voltage-stabilizing feedback control.

In order to stabilize the main output voltage and the auxiliary output voltage in the predetermined voltages to supply the loads due to the variation of the input voltage as well as the load variation. The following schemes can be employed:

A comparator (not shown) is used to compare the main output voltage with a first reference voltage (not shown). The first reference voltage is, namely, the expected main output voltage of the multi-output DC-to-DC conversion apparatus 60, and which is assumed as +12V. More particularly, a voltage difference between the actual main output voltage and the first reference voltage is fed back to the triggering controller 606, which can be a PWM controller in this embodiment. When the main output voltage is higher than the first reference voltage, the comparator outputs a low-level signal to increase switching frequency of the first control signal S1 and the third control signal S3 during the positive half cycle of the quasi-sinusoidal current. Where the first control signal S1 and the third control signal S3 are a driving signal for a gate-source voltage Vgs of the first semiconductor component 601 and that of the third semiconductor component 603, respectively. In addition, the main output voltage would increase when the input voltage of the DC-to-DC conversion apparatus 60 increases. Thus, during the negative half cycle of the quasi-sinusoidal current, the comparator outputs a low-level signal to increase switching frequency of the second control signal S2 and the fourth control signal S4, thus reducing the main output voltage and stabilizing it at +12V. Where the second control signal S2 and the fourth control signal S4 are a driving signal for a gate-source voltage Vgs of the second semiconductor component 602 and that of the fourth semiconductor component 604, respectively. In addition, because the auxiliary output voltage is proportional to the main output voltage (in this example, the main output voltage is twice of the auxiliary output voltage), the auxiliary output voltage can be stabilized at +6V.

Similarly, a comparator (not shown) is used to compare the auxiliary output voltage with a second reference voltage (not shown). The second reference voltage is, namely, the expected auxiliary output voltage of the multi-output DC-to-DC conversion apparatus 60, and which is assumed as +6V. More particularly, a voltage difference between the actual auxiliary output voltage and the second reference voltage is fed back to the triggering controller 606, which can be a PWM controller in this embodiment. When the auxiliary output voltage is lower than the second reference voltage, the comparator outputs a high-level signal to decrease switching frequency of the first control signal S1 and the third control signal S3 during the positive half cycle of the quasi-sinusoidal current. Where the first control signal S1 and the third control signal S3 are a driving signal for a gate-source voltage Vgs of the first semiconductor component 601 and that of the third semiconductor component 603, respectively. In addition, the auxiliary output voltage would increase when the input voltage of the DC-to-DC conversion apparatus 60 decreases. Thus, during the negative half cycle of the quasi-sinusoidal current, the comparator outputs a high-level signal to decrease switching frequency of the second control signal S2 and the fourth control signal S4, thus increasing auxiliary output voltage and stabilizing it at +6V. Where the second control signal S2 and the fourth control signal S4 are a driving signal for a gate-source voltage Vgs of the second semiconductor component 602 and that of the fourth semiconductor component 604, respectively. In addition, because the auxiliary output voltage is proportional to the main output voltage (in this example, the main output voltage is twice of the auxiliary output voltage), the main output voltage can be stabilized at +12V.

However, the above-mentioned examples of providing a voltage-stabilizing function are for demonstration and not for limitation of the present invention. Furthermore, the voltage-stabilizing circuits depend on the developed topologies of the switching power supply.

Therefore, the control signals for gate-source voltages of the controllable semiconductor components, which are MOSFETs in this embodiment, are controlled by sensing the main output voltage or the auxiliary output voltage. In addition, in this embodiment, the first semiconductor component 601 and the second semiconductor component 602 can be the uncontrollable semiconductor components, such as diodes. More particularly, the third semiconductor component 603 and the fourth semiconductor component 604 must be the controllable semiconductor components, such as MOSFETs, BJTs, or IGBTs. In other words, all of the four semiconductor components 601-604 are the controllable semiconductor components; or the first semiconductor component 601 and the second semiconductor component 602 are the uncontrollable semiconductor components, whereas the third semiconductor component 603 and the fourth semiconductor component 604 are the controllable semiconductor components.

The auxiliary output voltage is functioned as an input voltage of the buck converter 70, and the buck converter 70 converts the auxiliary output voltage into lower adjustable DC voltages, such as a first output voltage Vb1 and a second output voltage Vb2 (as shown in FIG. 2). Hence, the first output voltage Vb1 and the second output voltage Vb2 can be, but not limited to, a 5-volt DC voltage and a 3.3-volt DC voltage, respectively. In this example, the lower-level voltage (+6V) is functioned as the input voltage of the buck converter 70, but not the higher-level voltage (+12V). Thus, the lower-level auxiliary output voltage (+6V) is near the output voltage (+5V/+3.3V) of the buck converter 70, this can increase efficiency of the buck converter 70.

In conclusion, the present invention has following advantages:

1. The triggering controller 606 can generate a plurality of control signals to turn on and turn off the semiconductor component group 600 during the positive and negative half cycle of the quasi-sinusoidal current. Therefore, the main output voltage and the auxiliary output voltage are stabilized in the predetermined voltages according to the voltage difference between the actual main output voltage and the expected output voltage and the voltage difference between the actual auxiliary output voltage and the expected output voltage.

2. The DC-to-DC conversion apparatus 60 generates a lower-level auxiliary output voltage (with respective to the main output voltage), which is functioned as an input voltage of the buck converter 70. Because the lower-level auxiliary output voltage is near the output voltage of the buck converter 70, this can result in increased efficiency of the buck converter 70.

Although the present invention has been described with reference to the preferred embodiment thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A multi-output DC-to-DC conversion apparatus with a voltage-stabilizing function generating at least a main output voltage and an auxiliary output voltage; the auxiliary output voltage being lower than the main output voltage and functioned as an input voltage of a buck converter, and the buck converter being provided to convert the auxiliary output voltage into at least one lower adjustable DC voltage; the multi-output DC-to-DC conversion apparatus comprising:

a main transformer having a primary winding, a first secondary winding, and a second secondary winding; wherein the first secondary winding and the second secondary winding have a dotted terminal, a non-dotted terminal, and a medium terminal, respectively;

a semiconductor component group electrically connected to the dotted terminal and the non-dotted terminal of the first secondary winding and the dotted terminal and the non-dotted terminal of the second secondary winding of the main transformer; wherein one output terminal of the semiconductor component group is the ground, and the other output terminal is an auxiliary output terminal, which provides the auxiliary output voltage to the ground; the medium terminal of the first secondary winding is a main output terminal, which provides the main output voltage to the ground; and a triggering controller electrically connected to the main output terminal and the auxiliary output terminal and generating a plurality of control signals to control switching frequency of the semiconductor component group for stabilizing the main output voltage and the auxiliary output voltage;

whereby a center-tap of the main transformer with the first and second secondary windings provides a lower-level voltage, which is functioned as the input voltage of the buck converter to increase efficiency of the buck converter.

2. The multi-output DC-to-DC conversion apparatus in claim 1, wherein the semiconductor component group includes at least four semiconductor components.

3. The multi-output DC-to-DC conversion apparatus in claim 1, wherein the main output voltage is twice of the auxiliary output voltage.

4. The multi-output DC-to-DC conversion apparatus in claim 1, wherein the triggering controller is a pulse-width modulation controller.

5. The multi-output DC-to-DC conversion apparatus in claim 2, wherein the semiconductor components are controllable semiconductor components.

6. The multi-output DC-to-DC conversion apparatus in claim 2, wherein the semiconductor components are partially uncontrollable semiconductor components.

7. The multi-output DC-to-DC conversion apparatus in claim 1, wherein the switching frequency of the control signals outputted from the triggering controller is controlled by comparing the main output voltage with a predetermined voltage by the triggering controller.

8. The multi-output DC-to-DC conversion apparatus in claim 1, wherein the switching frequency of the control signals outputted from the triggering controller is controlled by comparing the auxiliary output voltage with a predetermined voltage by the triggering controller.

9. The multi-output DC-to-DC conversion apparatus in claim 1, further comprising inductor-capacitor filters to filter the main output voltage and the auxiliary output voltage.

* * * * *